United States Patent
Anand et al.

(10) Patent No.: US 12,321,404 B2
(45) Date of Patent: Jun. 3, 2025

(54) PRIVACY PRESERVING RECOMMENDATION SYSTEM

(71) Applicant: Google LLC, Mountain View, CA (US)

(72) Inventors: Rishav Anand, Mountain View, CA (US); Steven Guy Avery, Santa Clara, CA (US); Sittichai Jiampojamarn, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/562,943

(22) PCT Filed: Dec. 8, 2022

(86) PCT No.: PCT/US2022/052253
§ 371 (c)(1),
(2) Date: Nov. 21, 2023

(87) PCT Pub. No.: WO2024/123335
PCT Pub. Date: Jun. 13, 2024

(65) Prior Publication Data
US 2025/0077594 A1  Mar. 6, 2025

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/955* (2019.01); *G06F 21/6245* (2013.01)

(58) Field of Classification Search
CPC .. G06F 16/355; G06F 16/313; G06F 16/5838; G06F 16/5846; G06F 16/30;
(Continued)

(56) References Cited

U.S. PATENT DOCUMENTS

| | | | |
|---|---|---|---|
| 6,564,202 B1 * | 5/2003 | Schuetze | G06F 16/30 |
| 2003/0074368 A1 * | 4/2003 | Schuetze | G06F 16/355 |
| | | | 707/E17.022 |

FOREIGN PATENT DOCUMENTS

CN  107257499  9/2018

OTHER PUBLICATIONS

International Search Report and Written Opinion in International Appln. No. PCT/US2022/052253, mailed on Jun. 15, 2023, 16 pages.

(Continued)

*Primary Examiner* — Yicun Wu
(74) *Attorney, Agent, or Firm* — Fish & Richardson P.C.

(57) ABSTRACT

Methods, systems, and apparatus, including computer programs encoded on computer-storage media, for privacy preserving digital component provider. In some implementations, a method includes providing, by a user device and during a browsing session of content page at the user device, (1) a request for a digital component and (2) contextual data representing a context within which the content page is provided for display on the user device; obtaining an embedding vector that represents the contextual data as a set of features and the digital component; generating one or more adjusted embedding vectors for a first interest group, wherein the collection includes the embedding vector adjusted by one or more values; and providing the one or more adjusted embedding vectors to a server for generating a model for the first interest group.

20 Claims, 4 Drawing Sheets

(51) Int. Cl.
*G06F 16/955* (2019.01)
*G06F 21/62* (2013.01)

(58) Field of Classification Search
CPC .. G06F 16/5854; G06F 16/5866; G06F 16/34; G06F 16/353; G06F 16/358; G06F 16/904
See application file for complete search history.

(56) References Cited

OTHER PUBLICATIONS

Li et al., "Efficient privacy-preserving content recommendation for online social communities," Neurocomputing, Jan. 5, 2017, 219:440-454.

* cited by examiner

PRIVACY PRESERVING RECOMMENDATION SYSTEM

CROSS-REFERENCE TO RELATED APPLICATION

This application is a National Stage Application under 35 U.S.C. § 371 and claims the benefit of International Application No. PCT/US2022/052253, filed Dec. 8, 2022, the disclosure of which is incorporated herein by reference.

BACKGROUND

Webpages and applications provided to user devices can include one or more digital components that are displayed with content of a given webpage or application. The digital components may be provided to a user within a rectangular region that overlays a portion of a webpage or application screen.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files. For example, the digital component may be content that is intended to supplement content of a webpage or other resource. More specifically, the digital component may include digital content that is relevant to resource content (e.g., the digital component may relate to a topic that is the same as or otherwise related to a topic or content of a webpage). The provision of digital components can thus supplement, and generally enhance, a web page or application content.

SUMMARY

This specification generally relates to data processing as well as determining digital components for one or more user devices. One innovative aspect of the subject matter described in this specification is embodied in a method that includes receiving, from a first user device and during a browsing session of content page at the first user device, (1) a request for a digital component and (2) contextual data representing a context within which the content page is provided for display on the first user device; generating, based on the contextual data, a signal embedding vector that represents the contextual data as a set of features; providing, to the first user device, the signal embedding vector and the digital component; receiving, from the first user device, a content category embedding vector for each of one or more content categories associated with the first user device, where the content category vector is generated based on the signal embedding vector; updating, using the received content category embedding vectors, a respective model for the content categories; generating, based on an updated model and in response to data for a particular content category received from a second user device, a list of additional content categories; and transmitting, to the second user device, the list of additional content categories.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include obtaining the list of additional content categories; and providing data representing a digital component associated with at least one of the content categories of the list of additional content categories.

In some implementations, the contextual data includes a Uniform Resource Locator (URL) of the content page. In some implementations, the content category embedding vector for each of the one or more particular content categories associated with the first user device includes values adjusted using a privacy preserving algorithm from the signal embedding vector provided to the first user device.

In some implementations, the content category embedding vector is the same as the signal embedding vector. In some implementations, generating the list of additional content categories includes: determining a threshold in a multi-dimensional space including the model for the content categories; determining a first point in the multi-dimensional space representing a model of the particular content category received from the second user device; determining a second point in the multi-dimensional space representing a model for a second content category of the one or more content categories; determining a distance between the first point and the second point; determining the distance satisfies the threshold in the multi-dimensional space; and generating the list of additional content categories to include the second content category of the one or more particular content categories.

In some implementations, the second point in the multi-dimensional space representing the model for the second content category of the one or more content categories is one of N closest points to the first point in the multi-dimensional space and actions include: determining the N closest points to the first point in the multi-dimensional space, where N is a predetermine integer. In some implementations, the first user device is the second user device.

Another innovative aspect of the subject matter described in this specification is embodied in a method that includes providing, by a user device and during a browsing session of content page at the user device, (1) a request for a digital component and (2) contextual data representing a context within which the content page is provided for display on the user device; obtaining an embedding vector that represents the contextual data as a set of features and the digital component; generating one or more adjusted embedding vectors for a first interest group, where the one or more adjusted embedding vectors includes the embedding vector adjusted by one or more values and where the first interest group represents one or more content categories; and providing the one or more adjusted embedding vectors to a server for generating a model for the first interest group.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include receiving a list of additional content categories generated based on the one or more adjusted embedding vectors.

In some implementations, generating the one or more adjusted embedding vectors for the first interest group includes adjusting using a privacy preserving algorithm the embedding vector by the one or more values by adding noise to the embedding vector.

In some implementations, adding noise to the embedding vector includes adding or subtracting time from a time component of the embedding vector representing a time when the user device accessed the content page.

In some implementations, actions include providing second contextual data representing a context within which a second content page is provided for display on the user device; and obtaining a list of additional content categories based on a content category associated with the second content page.

In some implementations, actions include providing the list of additional content categories to the server with a second request for a digital component; obtaining the digital component; and generating a view of the second content page for display on the user device that includes the digital component at a location indicated by programming code representing the second content page.

Another innovative aspect of the subject matter described in this specification is embodied in a method that includes receiving, from a user device and during a browsing session of content page provided by a content provider at a first user device, data for a first interest group corresponding to the content page, where the first interest group represents one or more content categories; identifying, from among a set of models, a first model corresponding to the first interest group, where each model in the set of models corresponds to one or more content categories and is generated based on an aggregate of contextual data received during a plurality of browsing sessions at a plurality of user devices, and where the set of models is represented in a multidimensional space; identifying a subset of models from among the set of models that are within a predetermined distance from the first model in the multidimensional space; determining one or more content categories corresponding to the identified subset of models; and transmitting a list identifying the one or more content categories to the user device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. Compared to traditional web traffic analysis techniques, the techniques described herein do not require the monitoring or collection of individual data. Nor do these techniques rely on identifier based cross-site monitoring of a client/user device. The techniques can be used to prevent identifiable user information from being provided to content providers. In general, the techniques described herein can increase privacy while navigating on the web and still facilitate provision of relevant content to user devices.

The techniques described can be used in situations where third party cookies are unavailable. For example, for browsers or devices that block or do not support the use of third party cookies, the techniques described can provide content preferred by device users without collecting or analyzing their data through third party cookies.

Other methods to monitor device activity a user can be used in the absence of third party cookies, e.g., fingerprinting, webpage surveillance, among other. However, such tracking puts a user's privacy at risk. Instead of collecting and transmitting user device data over a network, user devices can store interest groups indicating one or more content categories preferred by a device user. User devices can provide to a processing server data indicating the interest groups together with data representing a given accessed webpage. The processing server can build models to generalize preferences or behavior based on multiple devices providing similar interest group data. The processing server can then use the models to predict content categories of interest for new or existing users without collecting and transmitting any associated data.

In some implementations, the techniques described help reduce network storage and usage data collected and transmitted from user devices to processing servers/content providers. For example, the techniques described can reduce storage requirements and reduce load on network communications by limiting the amount of data transmitted, e.g., to browsing data or data about interest groups-without requiring any transmission or storage of data indicating multiple websites visited over time and the associated activity. Indeed, as explained above, such data is not required by the techniques described to generate the corresponding models that facilitate the content provision.

Further still, for any data exchange between the user device and the processing server over a network, one or more privacy preserving algorithms are applied to the exchanged data, including, e.g., addition of noise, to further preserve the privacy of the underlying data being exchanged. As one example, a user device can provide a vector indicating an accessed web URL with additional noise such that the vector represents a webpage with similar features, such as similar content, but not necessarily the exact webpage accessed.

In some implementations, techniques described help balance processing resources. For example, a processing server that generates models used to predict related content categories for a given user can update the models when processing resource are available. The processing server can determine that a threshold amount of processing resources sufficient to update a model are available and proceed to update one or more models, e.g., as described herein. When sufficient resources are not available, a processing server can store data that can be used later when sufficient resource become available. Network resources can be used dynamically based on a determined processing load of the system.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a digital component provider generates a model from anonymized user session data of a user device. The provider can compare the model with models for specific content category models to determine what category of content to provide to the user device. For example, a user device can navigate to a webpage. A browser of the user device can request a digital component for the webpage. The request can include data of the webpage that indicates features of the webpage or identifies resources of the webpage. Using data of the webpage, a digital component provider can generate an embedding vector. A user device can provide one or more embedding vectors with corresponding content categories to the digital component provider. The digital component provider can generate a model for determining similar interest groups and related digital components using the model. Data indicating related digital components or interest groups can be provided to a user device and used by the user device to request digital components that correspond to a user's preference.

In some implementations, a user device provides contextual data and a request for a digital component to a server. The contextual data can include data representing a context within which a content page is provided for display on the user device, e.g., a Uniform Resource Locator (URL). The server can generate an embedding vector using the contextual data. The embedding vector can include numerical values that represent features of the content page, e.g., content, appearance, time of day, hosting site, among others.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally-identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 1:
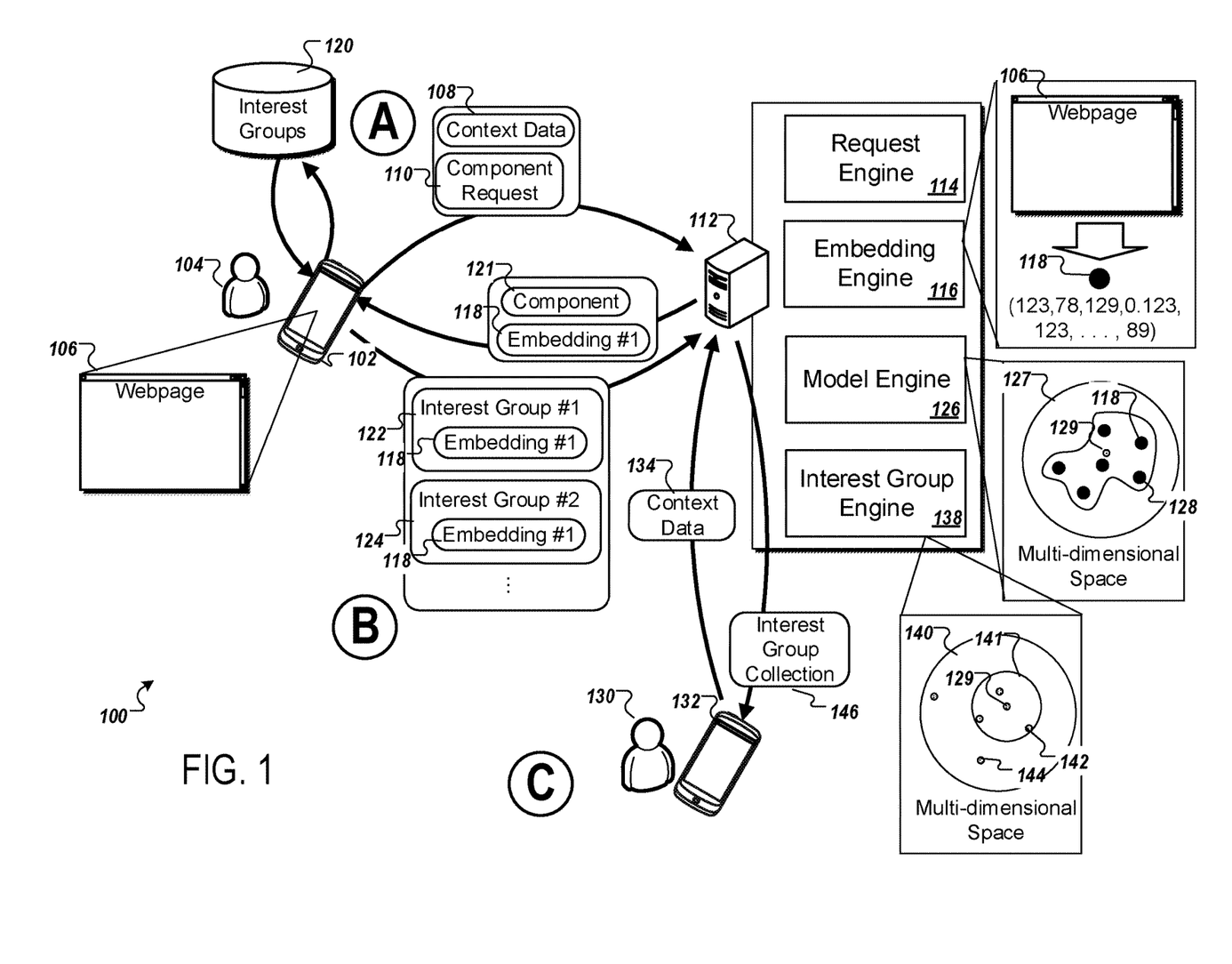
FIG. 1 is a diagram showing an example of a system for providing digital components.

FIG. 1 is a diagram showing an example of a system 100 for providing digital components. The system 100 includes a first user device 102, a processing server 112, and a second user device 132. The processing server 112 generates models representing particular content categories and provides digital components to user devices. The models generated by the processing server 112 can preserve privacy of users. For example, instead of using cookies or other web traffic analysis methods, the processing server 112 can use interest group classifications, e.g., one or more categories of content in which a given user is interested, stored one or more user devices, e.g., interest groups 120 stored by the user device 102, to generate models per interest group. The processing server 112 can then provide digital components based on receiving an indication that a user device is associated with one or more interest groups.

In some implementations, an interest group corresponds to a specific webpage or group of webpages visited. For example, a first interest group can correspond to users that have visited Nike.com. An interest group can have associated content categories. The first interest group can have associated content categories of shoes, fabric, fashion, among others. In some implementations, the system 100 provides digital components that feature specific content categories corresponding to an interest group for users that provide data indicating membership of the given interest group. For example, a user can provide data indicating membership of the first interest group. The processing server 112, or other processing element, can provide a digital component that feature shoes, fabric, fashion, among other elements corresponding to the first interest group.

In some implementations, the user device 102 and the user device 132 include portable computers, such as smartphones, wearable technology, laptops. In some implementations, the user device 102 and the user device 132 include stationary computers, such as desktop devices, servers, among others. In some implementations, the processing server 112 includes one or more processing components. For example, the processing server 112 can include a group of servers that work together to obtain component request, generate models, and provide digital components to user devices or one or more identifiers identifying one or more digital components that are obtained by a user device using the one or more identifiers, e.g., accessing a content server. In some implementations, the processing server 112 includes one or more supply-side platforms (SSPs) or demand-side platforms (DSPs) that generally facilitate the management and provision of digital components to user devices. In some implementations, the processing server 112 includes an aggregation server that aggregates contextual data to generate one or more models. The user device 102, the user device 132, and the processing server 112 are communicably connected using one or more communication channels, e.g., wired, wireless, Internet, among others.

In stage A, the user device 102 accesses a webpage 106. The user device 102 provides contextual data 108, e.g., a URL of a webpage, such as the webpage 106, and a component request 110, e.g., a request for a digital component, to the processing server 112. In some implementations, the user device 102 provides the contextual data 108 and the component request 110 in response to a webpage view event. The processing server 112 receives the contextual data 108 and the component request 110 from the user device 102. A request engine 114 operated by the processing server 112 parses the contextual data 108 and the component request 110. In some implementations, the request engine 114 parses the contextual data 108 to identify a uniform resource locator (URL). For example, the contextual data 108 can include a URL of the webpage 106. In some implementations, the contextual data 108 includes information obtained from a publisher providing a digital component. For example, a webpage can be a publisher publishing digital components. The webpage can obtain information relating to the user device 102 (e.g., type of device, operating system executing on the device, etc.). Information of the user device 102 or the user 104 can be included in the contextual data 108.

An embedding engine 116 operated by the processing server 112 generates an embedding 118 representing the webpage 106. In some implementations, the embedding engine 116 obtains a URL identified in the contextual data 108 by the request engine 114. For example, the embedding engine 116 can obtain a URL of the webpage 106 and access the webpage 106 to determine features of the webpage 106. In some implementations, the embedding engine 116 determines features of the webpage 106 including content, appearance, hosting site, among others. For example, the embedding engine 116 can determine one or more values that represent one or more features of the webpage 106. The embedding engine 116 can generate a vector that represents the webpage 106 as the embedding 118, e.g., 123, 78, 129, 0.123, 123, . . . , 89. The embedding 118 is shown graphically in FIG. 1 as a point in a multi-dimensional space where each dimension of the multi-dimensional space represents one or more features detected in webpages by the processing server 112.

The processing server 112 identifies a digital component 121 using the component request 110. In some implementations, the processing server 112 includes a DSP that provides a digital component using the component request 110. The processing server 112 provides both the component 121 and the embedding 118 to the user device 102.

In some implementations, the user device 102 generates a version of the embedding 118 that preserves privacy. For example, the user device 102 can add noise using a privacy preserving algorithm to the embedding 118. The embedding 118 including noise added by the user device 102 can then be provided by the user device 102 to the processing server 112.

In stage B, the user device 102 accesses stored interest groups 120, such as interest groups downloaded by a browser of the user device 102, e.g., after the user device 102 accesses a specific webpage corresponding to an interest group, or obtained from the processing server 112. The user device 102 iteratively provides the embedding 118 with data representing each interest group of the stored interest groups 120 to the processing server 112. For example, the user device 102 can provide a data packet that includes data representing a given interest group of the stored interest groups 120 and the embedding 118. The user device 102 can iterate over each of the stored interest groups in the stored interest groups 120. During each iteration, the user device 102 can send a data packet that includes data representing an interest group of the stored interest groups 120 and the embedding 118. The user device 102 can send data packets to the processing server 112.

In general, by providing one or more embeddings representing one or more webpages for each interest group, the user device 102 can enable the processing server 112 to generate a model for each interest group where the model aggregates multiple embeddings, e.g., obtained from one or more user devices, to determine likely features of a webpage corresponding to a particular interest group. In this way, the processing server 112 can determine likely interest groups for a user device based on features of a webpage accessed on a user device.

The processing server 112 obtains data provided by the user device 102 including an identifier of a first interest group 122 and the corresponding embedding 118 and an identifier of a second interest group 124 and the corresponding embedding 118. The first interest group 122 and the second interest group 124 can represent particular content categories in which a user 104 of the user device 102 is interested. In particular, the user device 102 can store interest group identifications provided by webpages accessed by the user device 102. Identifiers of interest groups can include alphanumeric, numeric, or other unique sets of symbols.

In some implementations, the user device 102 adds noise to the embeddings provided with the interest group identifiers. For example, the user device 102 can adjust one or more values of a vector representing the embedding 118, e.g., a time when the user device 102 accessed the webpage 106. In some implementations, by adding noise to the embedding 118 the system 100 prevents the processing server 112 from uniquely identifying the user device 102 or a corresponding user 104. In some implementations, the user device 102 adds differentially private noise to values at different indices of vectors representing the embeddings. The user device 102 can send the embeddings to the processing server 112 at the time of the component request 110 or at some later time.

A model engine 126 operated by the processing server 112 generates a model for each interest group provided by a give user device 102. The model engine 126 can generate or update a model using obtained embeddings corresponding to each interest group. In the example shown in FIG. 1, the processing server 112 obtains the embedding 118, or a noise adjusted version of embedding 118, associated with each of the first interest group 122 and the second interest group 124. Of course, a give user device can provide more or fewer interest group identifiers depending on a number of stored interest groups.

For each interest group identifier received, the model engine 126 generates or updates a model corresponding to that interest group. For example, the model engine 126 can update a model representing the first interest group 122 by adding) the embedding 118 to one or more previously obtained embeddings from the user device 102 or other user devices. An example model generation process is shown in FIG. 1. A multi-dimensional space 127 is shown as a circle. Points within the multi-dimensional space 127 represent embeddings received by the processing server 112. For example, the embedding 118 is shown within the multi-dimensional space 127 along with an embedding 128 and others. The difference in location between embedding 118 and 128 can represent a difference in associated webpage features corresponding to a webpage that was used to generate the corresponding embeddings 118 and 128. The difference in FIG. 1 is shown in 2 dimensions for simplicity but can be expressed as a cosine similarity for multi-dimensional values.

In some implementations, the model engine 126 generates a model for each interest group received as a centroid. For example, the model engine 126 can aggregate one or more embedding vectors to determine a center point of the vectors in the multi-dimensional space 127. Such a center point is shown graphically as point 129 in FIG. 1. The processing server 112 can use the point 129 to determine if webpages represented as embedding vectors correspond to a given interest group based on a distance between the point 129 and a generated embedding vector representing a webpage. A centroid can generally represent an average device behavior based on received browsing session data.

In some implementations, the processing server 112 iteratively builds models for each interest group using multiple embeddings and interest group identifier pairs received from user devices. For example, the processing server 112 can obtain embeddings and interest group identifiers from 100 different user devices. Each user device can provide a single embedding or multiple embeddings either in a single transmission or multiple transmissions to the processing server 112. The model engine 126 of the processing server 112 can identify a corresponding model by parsing a received interest group identifier. The model engine 126 can identify a model for a given interest group identifier and combine (e.g., add) a newly received embedding vectors with one or more previously obtained embedding vectors to generate an updated model, e.g., an updated centroid. In some implementations, generating an updated model includes averaging two or more embeddings corresponding to one or more interest group identifiers. For example, the model engine 126 can average at least embeddings 118 and 128 to generate an average centroid 129 that can represent the first interest group 122.

Figure 2:
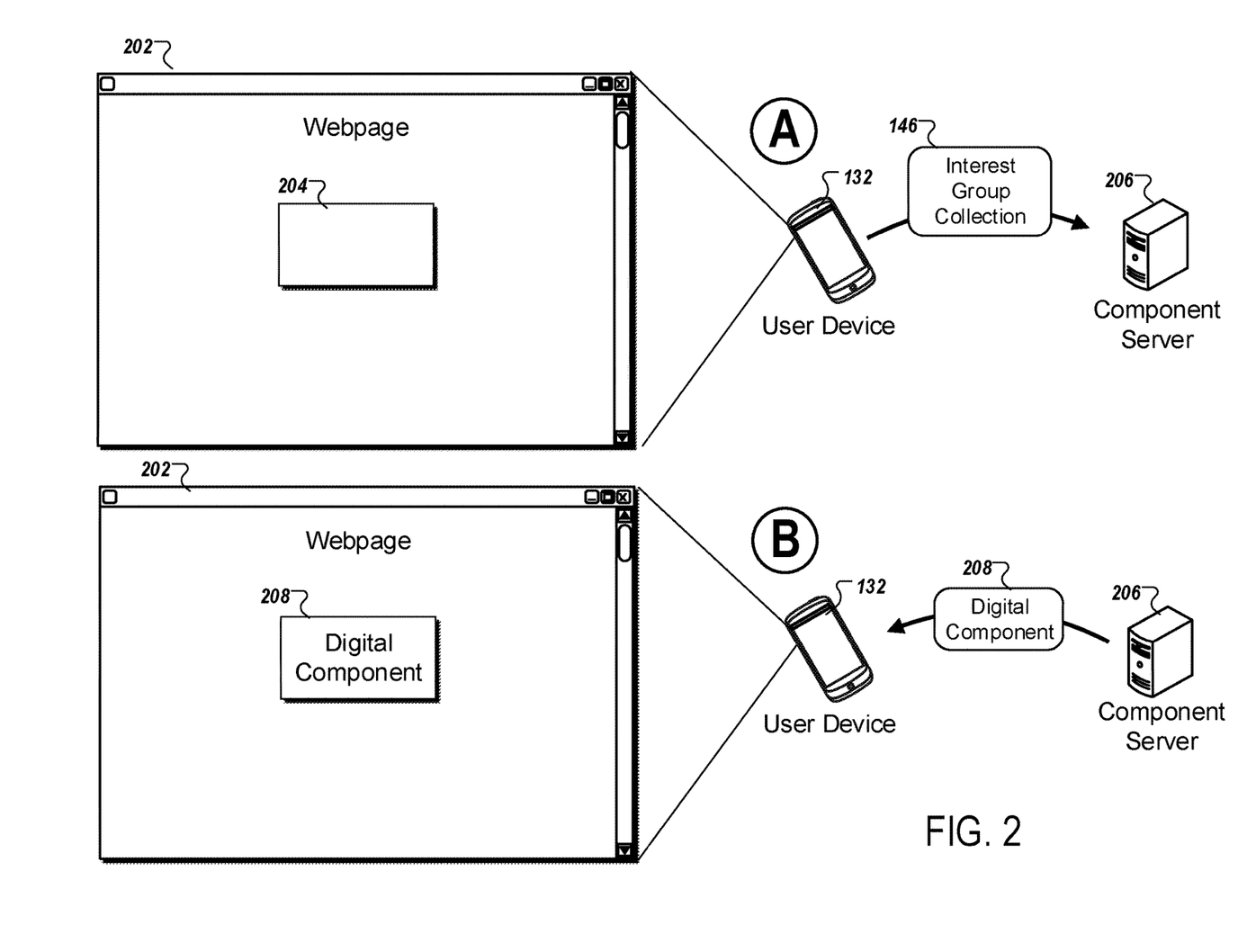
FIG. 2 is a diagram showing an example of providing digital components.

In stage C, the user device 132 provides contextual data 134, e.g., data indicating a URL of a webpage accessed by the user device 132, to the processing server 112. An interest group engine 138 operated by the processing server 112 generates an interest group collection 146. In some implementations, the interest group collection 146 represents one or more interest groups that are similar, within a multi-dimensional space such as the multi-dimensional space 127, to one or more webpages represented by the contextual data 134. The interest group collection 146 can be used by the user device 132 to obtain one or more digital components as shown in FIG. 2.

In some implementations, the interest group engine 138 uses a determined threshold 141 to determine what interest groups to include in the interest group collection 146. For example, the process of generated the interest group collection 146 can be shown graphically as in FIG. 1. A multi-dimensional space 140, similar to the multi-dimensional space 127, is represented as a circle with points within it. The points, such as the point 129, 142, and 144, represent centroids of interest groups. Corresponding embedding vectors are not shown for simplicity. In some implementations, the threshold 141 is represented by one or more values heuristically determined, e.g., by one or more users of the system 100.

In some implementations, the interest group engine 138 determines the threshold 141 using a trained model. For example, the processing server 112 can train a model to generate a threshold that includes similar interest groups and does not include dissimilar interest groups. Ground truth data can include user feedback, e.g., indicating a positive result, e.g., a user interacting with a provided digital component, or a user accessing one or more specific webpages corresponding to a predicted interest group after a component corresponding to the predicted interest group is provided to a user device. In some cases, user feedback can be provided directly by a user using an interface of a corresponding user device where the feedback is provided by the user device to the processing server 112. The processing server 112 can adjust one or more weights or other parameters of a trained model such that the model is more likely to select actually similar groups, e.g., interest groups that align with preferences of a corresponding user of a device.

A graphical depiction of the generation of the interest group collection 146 is shown in FIG. 1. The interest group engine 138 determines the threshold 141 centered around the point 129. The center point for the threshold 141 can include a standard interest group associated with a webpage accessed by the user device 132. For example, when user 130 uses the user device 132 to navigate to a first website, the first website can instruct the user device 132 to store a first interest group, such as the interest group corresponding to the point 129 of the model generated by the model engine 126. The interest group engine 138 can determine the first interest group as the standard interest group for the user device 132 based on the contextual data 134, such as data indicating a first webpage accessed by the user device 132.

In some implementations, the interest group engine 138 centers the threshold 141 about the point representing the standard interest group, e.g., the center point 129 for the first interest group 122. For data indicating other interest groups, the interest group engine 138 can center a corresponding threshold about the point representing the corresponding standard interest group.

In some implementations, the threshold 141 is not circular. For example, the threshold 141 can represent any boundary around a given point in multi-dimensional space, such as multi-dimensional space 140. The threshold 141 can be represented by one or more values.

In some implementations, the interest group engine 138 generates the interest group collection 146 that includes interest group identifiers for interest groups represented by a point that satisfies the threshold 141. For example, the point 142 can represent a given interest group. Because the point 142 is determined, by the interest group engine 138 to satisfy the threshold 141, the interest group engine 138 can add the given interest group represented by the point 142 to the interest group collection 146.

In some implementations, a distance between a center point, such as the point 129, and a neighboring point, such as the point 142, is computed and compared with a threshold. For example, the interest group engine 138 can generate a distance that represents a distance in the multi-dimensional space 140 between the point 129 and the point 142. Distance can be generated in a number of ways, such as cosine similarity, Euclidean distance, among others. The interest group engine 138 can compare a determined distance with a threshold, such as the threshold 141. If the distance satisfies the threshold 141, e.g., is less than, less than or equal to, greater than, greater than or equal to, equal to, among others, the interest group engine 138 can include the point 142 in the interest group collection 146.

The processing server 112 provides the interest group collection 146 to the user device 132. The interest group collection 146 can include one or more interest groups that have not been stored by the user device 132. In some implementations, the interest group collection 146 includes one or more interest groups previously stored by the user device 132. The user device 132 can determine one or more interest groups of the interest group collection 146 that have already been stored and not store corresponding interest group information for those interest groups, e.g., interest group identifiers.

FIG. 1 is described in stages A through C for ease of understanding. In some implementations, operations performed by the system 100 occur in other orders. For example, the processing server 112 can obtain embedding vector information from one or more other user devices in parallel or serially with embeddings obtained from the user device 102. In some implementations, the processing server 112 provides the interest group collection 146 in parallel or serially with updating or generating one or more models of interest groups. In some implementations, the processing server 112 provides the interest group collection 146 and then obtains one or more embeddings for corresponding interest groups to generate or update one or more interest group models.

In some implementations, an aggregation server of the processing server 112 periodically provides a generated model of one or more interest groups to a DSP of the processing server 112. For example, an aggregation server can generate or update one or more models for one or more interest groups, such as the centroid model for the first interest group 122 represented by the center point 129. The aggregation server can provide data indicating the centroid model for the first interest group 122 or one or more other centroid models to a DSP. The DSP can then use the one or more models to identify and provide one or more digital components to one or more user devices, e.g., as shown in FIG. 2.

In some implementations, components of the system 100 are connected by any form or medium of digital data communication, e.g., a communication network. For example, the first user device 102, the processing server 112, and the second user device 132 can be connected by a network. The first user device 102, the processing server 112, and the second user device 132 can communicate over the network. Examples of communication networks include a local area network ("LAN") and a wide area network ("WAN"), e.g., the Internet.

FIG. 2 is a diagram showing an example of providing digital components. For ease of explanation, the user device 132 is reused. The user device 132, as shown in FIG. 1, obtains the interest group collection 146. FIG. 2 shows the user device 132 providing the interest group collection 146 to a component server 206 to generate a digital component in the area 204 on a webpage 202 accessed by the user device 132.

In stage A of FIG. 2, the user device 132 provides the interest group collection 146 to the component server 206. The user device 132 and the component server 206 can be connected by a communication network as described herein. The user device 132 can provide the interest group collection 146 to the component server 206 using one or more connected communication networks.

In some implementations, the component server 206 is the processing server 112. In some implementations, the component server 206 includes one or more SSPs or DSPs. In some implementations, one or more DSPs of the component server 206 provide digital components using one or more interest groups included in the interest group collection 146. For example, the component server 206 can determine one or more interest groups of the interest group collection 146 that have been applied to a threshold number of devices or users or are within a threshold ranking indicating most used interest groups.

In some implementations, the component server 206 obtains one or more digital components provided by one or more digital component providers based on one or more determined interest groups. For example, the component server 206 can determine a subset of the interest group collection 146. Digital component providers can provide one or more digital components to the component server 206.

In stage B of FIG. 2 the component server 206 provides a digital component 208 to the user device 132. The user device 132 obtains the digital component 208 and renders the digital component 208 within the webpage 202 at a location indicated by the area 204. In some implementations, the area 204 is an iframe within a webpage represented in hypertext markup language (HTML).

Figure 3:
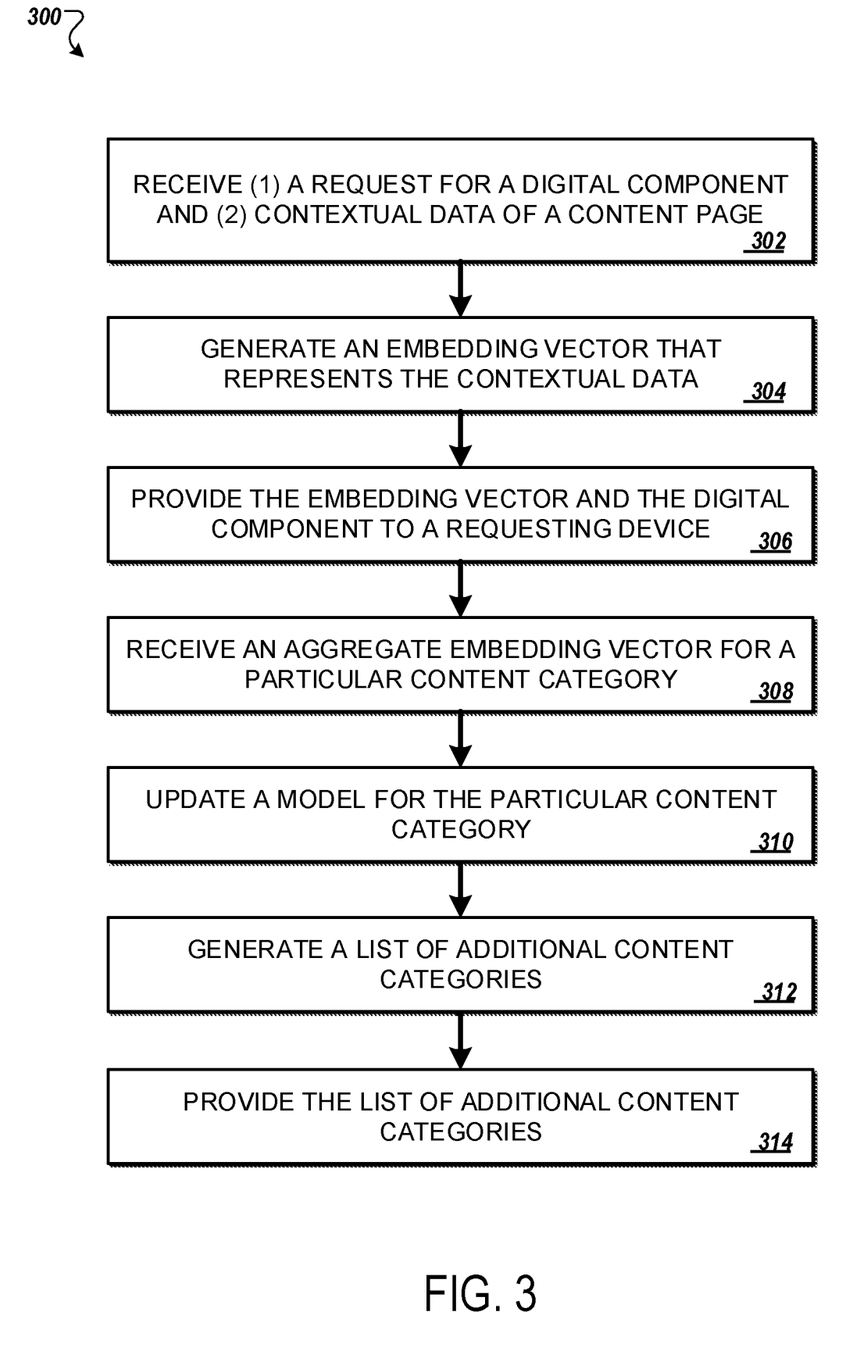
FIG. 3 is a flow diagram illustrating an example of a process for providing digital components.

FIG. 3 is a flow diagram illustrating an example of a process 300 for providing digital components. The process 300 may be performed by one or more electronic systems, for example, the system 100 of FIG. 1. Operations of the process 300 are described below for illustration purposes only. Operations of the process 300 can be performed by any appropriate device or system, e.g., any appropriate data processing apparatus. Operations of the process 300 can also be implemented as instructions stored on a computer readable medium which may be non-transitory. Execution of the instructions causes one or more data processing apparatus to perform operations of the process 300.

The process 300 includes receiving (1) a request for a digital component and (2) contextual data of a content page (302). For example, and as described with reference to FIGS. 1 and 2, the processing server 112 can obtain the contextual data 108 and the component request 110 from the user device 102.

The process 300 includes generating an embedding vector that represents the contextual data (304). For example, and as described with reference to FIGS. 1 and 2, the embedding engine 116 operated by the processing server 112 can generate the embedding 118 which can be represented by values, such as 123, 78, 129, 0.123, 123, . . . , 89.

The process 300 includes providing the embedding vector and the digital component to a requesting device (306). For example, and as described with reference to FIGS. 1 and 2, the processing server 112 can provide the component 121 and the embedding 118 to the user device 102.

The process 300 includes receiving an aggregate embedding vector for a particular content category (308). For example, and as described with reference to FIGS. 1 and 2, the processing server 112 receives the embedding 118 for the first interest group 122.

In some implementations, the process 300 includes receiving, from the first user device, a content category embedding vector for each of one or more content categories associated with the first user device, where the content category vector is generated based on the signal embedding vector. For example, a content category embedding vector can be the same as the signal embedding vector generated by the processing server, e.g., embedding 118. In some implementations, the content category embedding vector is different, e.g., noise added value to the originally generated embedding 118. In some implementations, the content category embedding vector is a combination of one or more embeddings obtained by the user device 102. For example, the user device 102 can obtain one or more embeddings, e.g., representing different webpage visits over time, from the processing server 112 and combine the one or more embeddings to generate a single embedding that is provided to, and obtained by, the processing server 112 with one or more interest group identifiers. Pre-aggregation by the user device 102 can be used to reduce communication to and from the processing server 112.

In some implementations, send aggregated data by a user device is restricted to improve privacy. For example, sending over a combination of multiple items of contextual data, such as the interest groups 120 and embeddings, can be, in some cases, unique enough to identify a device or specific user. Sending over data one by one, e.g., one embedding and one interest group identifier at a time, can improve privacy. In some implementations, pre-aggregation is used to achieve performance gains by reducing an amount of information sent between a user device and processing server. In some cases, pre-aggregation implementations can include additional privacy preserving techniques, such as additive noise, to help anonymize contextual data sent to the processing server 112.

The process 300 includes updating a model for the particular content category (310). For example, and as described with reference to FIGS. 1 and 2, the model engine 126 operated by the processing server 112 can generate or update a model for the first interest group 122 using an identifier of the first interest group provided by the user device 102. In some implementations, the model for the first interest group 122 is a centroid model represented by the point 129 in a multi-dimensional space, such as the multi-dimensional space 127 (as described with reference to FIG. 1).

In some implementations, the processing server 112 generates updates to a given model using embeddings provided by the user device 102. For example, the user device 102 can provide the embedding 118 with data indicating the first interest group 122. In some cases, the embedding 118 with data indicating the first interest group 122 is a vector where one or more values of the vector represent the embedding 118 and one or more values of the vector represent the first interest group 122. In some implementations, the user device 102 adds noise to prevent attribution to the user 104 or the user device 102. For example, the user device 102 can add randomly generated values to one or more values of a vector that represents the embedding 118 with data indicating the first interest group 122.

The process 300 includes generating a list of additional content categories (312). For example, the processing server 112 generates the interest group collection 146. In some implementations, the interest group engine 138 operated by the processing server 112 uses a threshold to determine additional content categories. For example, the interest group engine 138 can identify a standard interest group using the contextual data 134 provided by the user device 132. The interest group engine 138 can determine, using the threshold 141 around the standard interest group point in the multi-dimensional space 140, additional interest groups as interest groups with a centroid within the threshold 141, such as the centroid 142.

The process 300 includes providing the list of additional content categories (314). For example, the processing server 112 can provide the interest group collection 146 to the user device 132 or the user device 102. In some implementations, the user device 132 uses the interest group collection 146 to obtain digital components, e.g., as shown in FIG. 2.

In some implementations, engines, such as the request engine 114, the embedding engine 116, the model engine 126, and the interest group engine 138, include a set of programming instructions executable by a processor. The execution of set of instructions representing an engine can collectively represent the operations described as performed by these engines.

Figure 4:
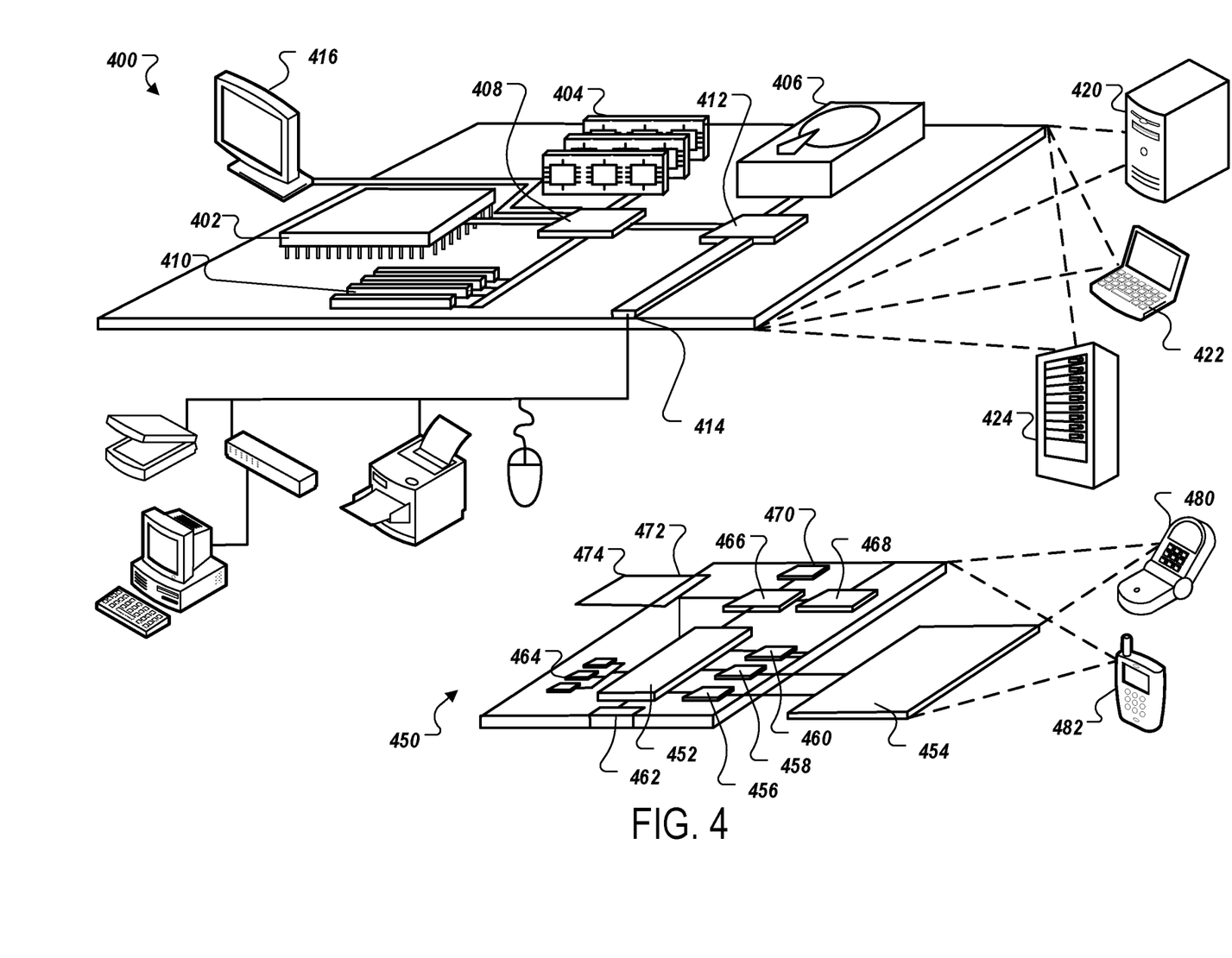
FIG. 4 is a diagram illustrating an example of a computing system used for providing digital components.

FIG. 4 is a diagram illustrating an example of a computing system used for providing digital components. The computing system includes computing device 400 and a mobile computing device 450 that can be used to implement the techniques described herein. For example, one or more components of the system 100 could be an example of the computing device 400 or the mobile computing device 450, such as a computer system implementing the processing server 112, devices that access information from the processing server 112, or a storage unit that accesses or stores information regarding the operations performed by the processing server 112.

The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 402 is a single threaded processor. In some implementations, the processor 402 is a multi-threaded processor. In some implementations, the processor 402 is a quantum computer.

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine readable mediums (for example, the memory 404, the storage device 406, or memory on the processor 402).The high-speed interface 408 manages bandwidth-intensive operations for the computing device 400, while the low-speed interface 412 manages lower bandwidth-intensive operations. Such allocation of functions is an example only. In some implementations, the high speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may include one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry in some cases. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 468 using a radio frequency. In addition, short-range communication may occur, such as using a Bluetooth, Wi-Fi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, among others) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
   receiving, from a first user device and during a browsing session of content page at the first user device, (1) a request for a digital component and (2) contextual data representing a context within which the content page is provided for display on the first user device;
   generating, based on the contextual data, a signal embedding vector that represents the contextual data as a set of features;
   providing, to the first user device, the signal embedding vector and the digital component;
   receiving, from the first user device, a content category embedding vector for each of one or more content categories associated with the first user device, wherein the content category vector is generated based on the signal embedding vector;
   updating, using the received content category embedding vectors, a respective model for the content categories;
   generating, based on an updated model and in response to data for a particular content category received from a second user device, a list of additional content categories; and
   transmitting, to the second user device, the list of additional content categories.

2. The method of claim 1, comprising:
   obtaining the list of additional content categories; and
   providing data representing a digital component associated with at least one of the content categories of the list of additional content categories.

3. The method of claim 1, wherein the contextual data includes a Uniform Resource Locator (URL) of the content page.

4. The method of claim 1, wherein the content category embedding vector for each of the one or more particular content categories associated with the first user device includes values adjusted using a privacy preserving algorithm from the signal embedding vector provided to the first user device.

5. The method of claim 1, wherein the content category embedding vector is the same as the signal embedding vector.

6. The method of claim 1, wherein generating the list of additional content categories includes:
   determining a threshold in a multi-dimensional space including the model for the content categories;
   determining a first point in the multi-dimensional space representing a model of the particular content category received from the second user device;
   determining a second point in the multi-dimensional space representing a model for a second content category of the one or more content categories;
   determining a distance between the first point and the second point;
   determining the distance satisfies the threshold in the multi-dimensional space; and
   generating the list of additional content categories to include the second content category of the one or more particular content categories.

7. The method of claim 6, wherein the second point in the multi-dimensional space representing the model for the second content category of the one or more content categories is one of N closest points to the first point in the multi-dimensional space and the method comprises:
   determining the N closest points to the first point in the multi-dimensional space, where N is a predetermine integer.

8. The method of claim 1, wherein the first user device is the second user device.

9. A system comprising one or more computers and one or more storage devices on which are stored instructions that are operable, when executed by the one or more computers, to cause the one or more computers to perform operations comprising:
   receiving, from a first user device and during a browsing session of content page at the first user device, (1) a request for a digital component and (2) contextual data representing a context within which the content page is provided for display on the first user device;
   generating, based on the contextual data, a signal embedding vector that represents the contextual data as a set of features;
   providing, to the first user device, the signal embedding vector and the digital component;
   receiving, from the first user device, a content category embedding vector for each of one or more content categories associated with the first user device, wherein the content category vector is generated based on the signal embedding vector;
   updating, using the received content category embedding vectors, a respective model for the content categories;
   generating, based on an updated model and in response to data for a particular content category received from a second user device, a list of additional content categories; and
   transmitting, to the second user device, the list of additional content categories.

10. The system of claim 9, wherein the operations comprise:
    obtaining the list of additional content categories; and
    providing data representing a digital component associated with at least one of the content categories of the list of additional content categories.

11. The system of claim 9, wherein the contextual data includes a Uniform Resource Locator (URL) of the content page.

12. The system of claim 9, wherein the content category embedding vector for each of the one or more particular content categories associated with the first user device includes values adjusted using a privacy preserving algorithm from the signal embedding vector provided to the first user device.

13. The system of claim 9, wherein the content category embedding vector is the same as the signal embedding vector.

14. The system of claim 9, wherein generating the list of additional content categories includes:
   determining a threshold in a multi-dimensional space including the model for the content categories;
   determining a first point in the multi-dimensional space representing a model of the particular content category received from the second user device;
   determining a second point in the multi-dimensional space representing a model for a second content category of the one or more content categories;
   determining a distance between the first point and the second point;
   determining the distance satisfies the threshold in the multi-dimensional space; and
   generating the list of additional content categories to include the second content category of the one or more particular content categories.

15. The system of claim 14, wherein the second point in the multi-dimensional space representing the model for the second content category of the one or more content categories is one of N closest points to the first point in the multi-dimensional space and the operations comprise:
   determining the N closest points to the first point in the multi-dimensional space, where N is a predetermine integer.

16. The system of claim 9, wherein the first user device is the second user device.

17. One or more computer storage media encoded with instructions that, when executed by one or more computers, cause the one or more computers to perform operations comprising:
   receiving, from a first user device and during a browsing session of content page at the first user device, (1) a request for a digital component and (2) contextual data representing a context within which the content page is provided for display on the first user device;
   generating, based on the contextual data, a signal embedding vector that represents the contextual data as a set of features;
   providing, to the first user device, the signal embedding vector and the digital component;
   receiving, from the first user device, a content category embedding vector for each of one or more content categories associated with the first user device, wherein the content category vector is generated based on the signal embedding vector;
   updating, using the received content category embedding vectors, a respective model for the content categories;
   generating, based on an updated model and in response to data for a particular content category received from a second user device, a list of additional content categories; and
   transmitting, to the second user device, the list of additional content categories.

18. The storage media of claim 17, wherein the operations comprise:
   obtaining the list of additional content categories; and
   providing data representing a digital component associated with at least one of the content categories of the list of additional content categories.

19. The storage media of claim 17, wherein the contextual data includes a Uniform Resource Locator (URL) of the content page.

20. The storage media of claim 17, wherein the content category embedding vector for each of the one or more particular content categories associated with the first user device includes values adjusted using a privacy preserving algorithm from the signal embedding vector provided to the first user device.

* * * * *

UNITED STATES PATENT AND TRADEMARK OFFICE
CERTIFICATE OF CORRECTION

| | | |
|---|---|---|
| PATENT NO. | : 12,321,404 B2 | Page 1 of 1 |
| APPLICATION NO. | : 18/562943 | |
| DATED | : June 3, 2025 | |
| INVENTOR(S) | : Anand et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 22 days.

Signed and Sealed this
Sixteenth Day of December, 2025

John A. Squires
*Director of the United States Patent and Trademark Office*